2 Sheets--Sheet 1.
G. W. PARKER.
Camera-Attachment.
No. 159,443. Patented Feb. 2, 1875.
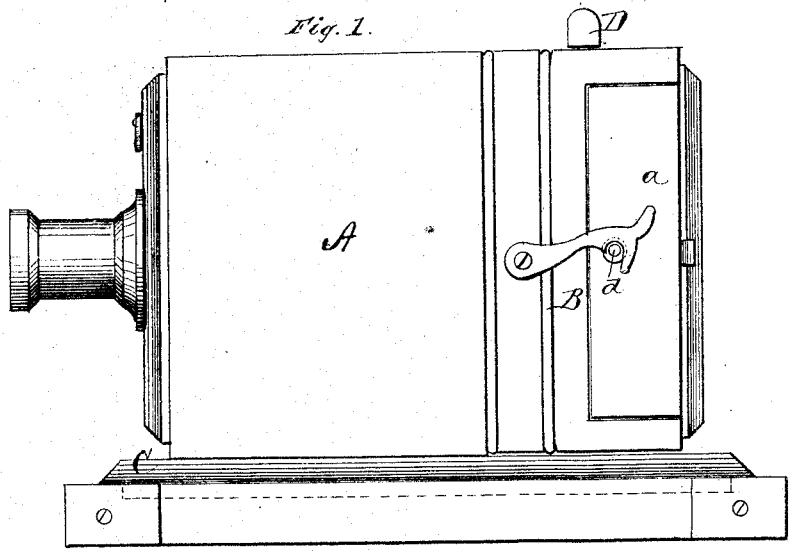
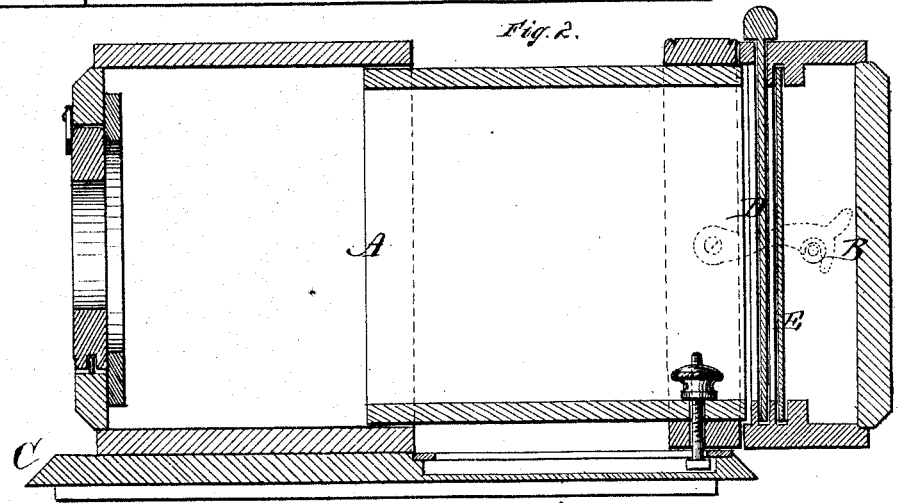
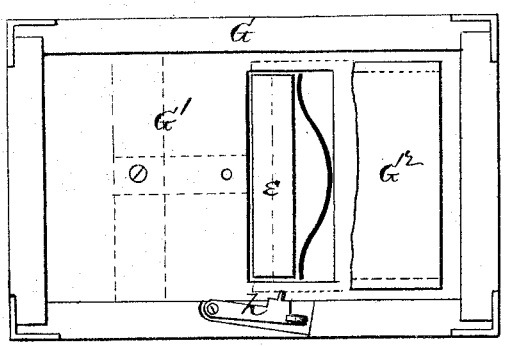
WITNESSES:
P. C. Dietench
W. C. McArthur
INVENTOR.
Geo W Parker
per J H Alexander
ATTORNEY.

2 Sheets--Sheet 2.
G. W. PARKER.
Camera-Attachment.
No. 159,443. Patented Feb. 2, 1875.
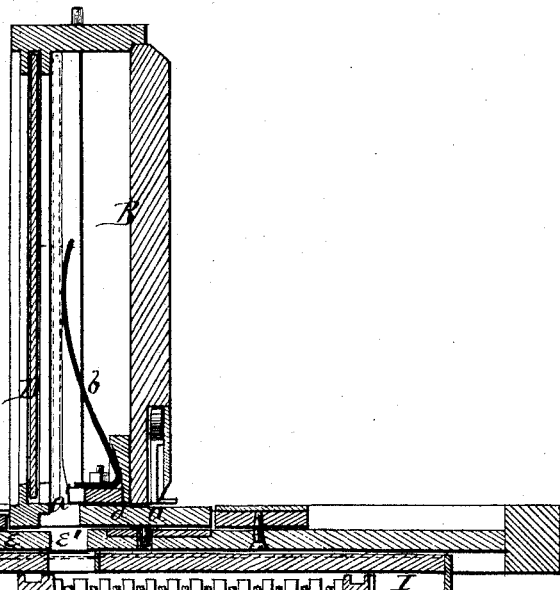
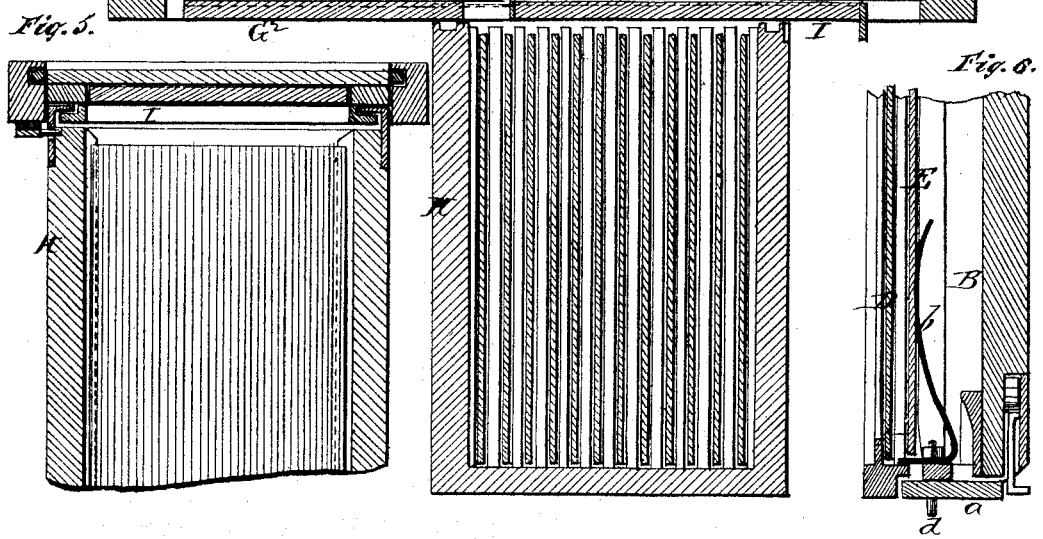
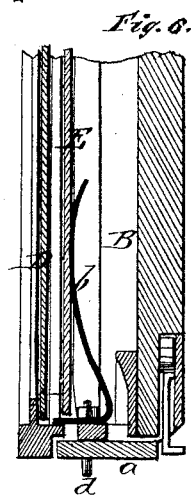
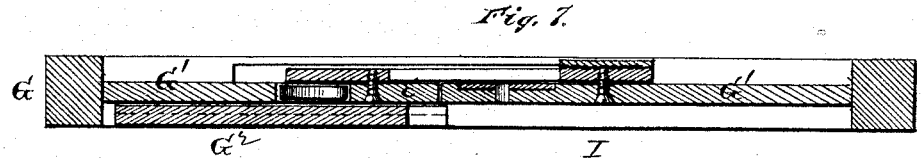
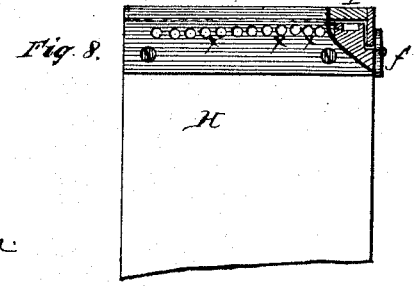
WITNESSES:
P. C. Dieterich
W. C. McArthur
INVENTOR.
Geo W Parker
per J. H. Alexander
ATTORNEY.

UNITED STATES PATENT OFFICE.

GEORGE W. PARKER, OF BAINBRIDGE, NEW YORK.

IMPROVEMENT IN CAMERA ATTACHMENTS.

Specification forming part of Letters Patent No. 159,443, dated February 2, 1875; application filed June 17, 1874.

*To all whom it may concern:*

Be it known that I, GEO. W. PARKER, of Bainbridge, in the county of Chenango and State of New York, have invented certain new and useful Improvements in Photographic Cameras; and I do hereby declare that the following is a full, clear, and exact description thereof, reference being had to the accompanying drawings and to the letters of reference marked thereon, which form part of this specification.

My invention relates to such apparatus as are used for taking photographs out of doors; and it consists in the construction and arrangement of the camera proper, a plate-box containing the prepared plates, and an intermediate device used for transferring the plates from one to the other, and vice versa, the object being to prevent their exposure to the light while thus transferring them, as will be hereinafter more fully set forth.

In the accompanying drawings, Figure 1 is a side elevation of the camera. Fig. 2 is a longitudinal vertical section of the same. Fig. 3 is a bottom view of the transferring device. Fig. 4 is a longitudinal vertical section of the parts when in position for transferring plates. Fig. 5 is a section of the plate-box. Fig. 6 is a section of the plate-holder of the camera; Fig. 7, a longitudinal section of the transferring device, and Fig. 8 a side view of the plate-box.

A represents the camera proper, with plate-holder B and bed-piece C. The plate-holder B is provided with the usual slide D, which is used, as in an ordinary camera, for the purpose of exposing and closing the plate-holder. At one end of the plate-holder B is a slide, $a$, held by a suitable spring-catch, which slide covers an aperture, $a'$, and may be moved to uncover the same. To the slide $a$ is attached a spring, $b$, for holding the glass E to its place, and on the outer side of the slide is a pin, $d$. The transferring device consists of a frame, G, with panel $G^1$ in the center, the frame extending on both sides thereof. In the panel $G^1$, at or near the center, is an aperture, $e'$, closed by a spring-slide, $e$, and upon the opposite side of the panel from this slide is a piece, $G^2$, constructed with grooves in its edges, as shown in Fig. 3. H represents the plate-box, provided with a sliding lid, I, held closed by a button, $f$. The interior of the box is provided with a series of vertical grooves for the insertion of the plates, and on one side, at this end of the box, is a series of holes corresponding with said grooves.

The plates, when prepared in the gallery or any convenient dark place, are placed in the box H, and kept until wanted. When wanted for use, the device G $G^1$, which is attached to the bed-piece C, and forms the support for the camera, is detached therefrom. The camera is then placed in position, and the focus taken the same as any other camera, by means of a ground glass.

The device G $G^1$ is placed on top of the plate-box H in such a manner that the hook $h$ will be underneath and on the same side as the holes $x$, and turn the button $f$ away from the lid I.

The plate-holder B is placed on top of the device G $G^1$, with the pin $d$ in a hole, $y$, in the panel. By now pushing the holder forward as far as it can go, the slides $a$ and $e$ will be opened, uncovering the openings $a'$ $e'$. The plate-box H in the meantime should also be moved until the hook $h$ can enter the first hole, $x$, the sliding cover I remaining, and only the box moving, hence uncovering a certain portion of the box.

By now turning the whole device upside down, the first glass will run out of the plate-box into the plate-holder, when the holder is drawn back in its first position, closing the slides $a$ $e$, and the plate-box also closed. After it has been exposed in the camera, it is returned in the same manner to the plate-box; and, by loosening the hook $h$, and moving the box H forward till the hook can enter the next hole, the second glass can be taken out and afterward returned again, and so on till all the plates are used, without at any time exposing them to the light. The plates can be developed at any time.

Having thus fully described my invention, what I claim as new, and desire to secure by Letters Patent, is—

1. The transferring device G G¹, provided with plate G², all arranged in the manner shown, and for the purpose set forth.

2. In a photographic camera, the combination of plate-holder B, slide D, aperture $a'$, slide $a$, and spring $b$, with the transferring devices G G¹, constructed as described, aperture E', and grooved plate G², all combined and arranged as set forth.

In testimony that I claim the foregoing as my own I affix my signature in presence of two witnesses.

GEO. W. PARKER.

Witnesses:
 WM. S. SAYRE,
 GEO. L. WINSOR.